United States Patent
Kurosaki et al.

(10) Patent No.: US 7,318,156 B2
(45) Date of Patent: Jan. 8, 2008

(54) GROUP SIGNATURE APPARATUS AND METHOD

(75) Inventors: Masato Kurosaki, Kanagawa (JP); Naoyasu Terao, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 822 days.

(21) Appl. No.: 10/340,608

(22) Filed: Jan. 13, 2003

(65) Prior Publication Data
US 2003/0188167 A1  Oct. 2, 2003

(30) Foreign Application Priority Data
Mar. 29, 2002 (JP) .............................. 2002-098010

(51) Int. Cl.
  *H04L 9/32* (2006.01)
(52) U.S. Cl. .................. 713/170; 713/156; 713/175
(58) Field of Classification Search ............... 713/170, 713/156, 175
  See application file for complete search history.

(56) References Cited

U.S. PATENT DOCUMENTS

| | | | |
|---|---|---|---|
| 5,933,503 A * | 8/1999 | Schell et al. ............ | 713/189 |
| 6,154,841 A * | 11/2000 | Oishi .................... | 713/180 |
| 6,694,436 B1 * | 2/2004 | Audebert ................ | 726/9 |
| 6,912,656 B1 * | 6/2005 | Perlman et al. .......... | 713/170 |
| 2002/0007453 A1 * | 1/2002 | Nemovicher ............. | 713/155 |
| 2002/0076053 A1 * | 6/2002 | Hachimura ............. | 380/277 |
| 2003/0131232 A1 * | 7/2003 | Fraser et al. .......... | 713/156 |

FOREIGN PATENT DOCUMENTS

| | | |
|---|---|---|
| JP | 2000-066593 A | 3/2000 |
| KR | 2001-537010 * | 6/2001 |

OTHER PUBLICATIONS

Yuh-Min Tseng et al. "Improved group signature scheme based on discrete logarithm problem" Jan. 7, 1999 pp. 37-28.*
Harn, L "Group-oriented (t, n) threshold digital signature scheme anddigital multisignature" Sep. 1994, pp. 307-313.*

* cited by examiner

*Primary Examiner*—Nasser Moazzami
*Assistant Examiner*—Eleni A Shiferaw
(74) *Attorney, Agent, or Firm*—Oliff & Berridge PLC

(57) ABSTRACT

A mail receiving section receives S/MIME signature mail from a host of a member. A member checking section checks the electronic signature of the signature mail for validity and determines whether or not the member belongs to a group. If the member checking section checks that the mail is from the valid member, a mail storing section requests an archive service section to archive the mail. A signature creating section uses a secret key unique to the group to create an electronic signature of the group. A mail transmitting section transmits the mail with the electronic signature of the group to the receiver.

13 Claims, 8 Drawing Sheets

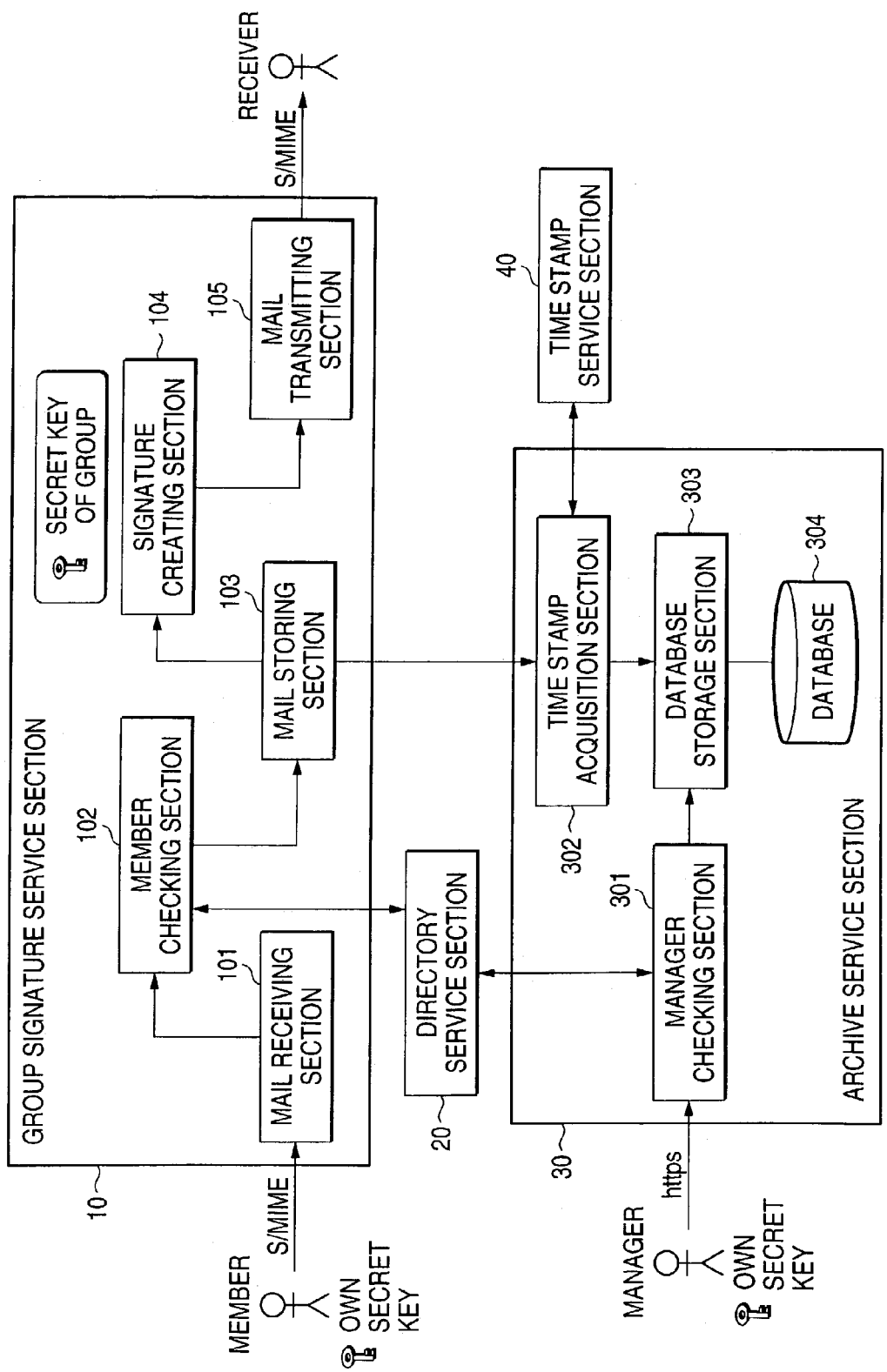

FIG. 2

| ATTRIBUTE NAME | DESCRIPTION |
|---|---|
| GROUP MAIL ADDRESS | MAIL ADDRESS OF GROUP |
| GROUP CERTIFICATE | CERTIFICATE WITH GROUP MAIL ADDRESS DESCRIBED |
| MEMBER MAIL ADDRESS | MAIL ADDRESS OF ALL MEMBERS |
| MEMBER CERTIFICATE | CERTIFICATES OF ALL MEMBERS |
| MANAGER MAIL ADDRESS | MAIL ADDRESS OF MANAGER |
| MANAGER CERTIFICATE | CERTIFICATE OF MANAGER |
| MAIL ADDRESS OF GROUP SIGNATURE SERVICE | MAIL ADDRESS ACCEPTING GROUP SIGNATURE FUNCTION |

FIG. 3

| ATTRIBUTE NAME | DESCRIPTION |
|---|---|
| ORIGINAL MAIL | MAIL WITH SIGNATURE OF MEMBER |
| TIME STAMP | TIME STAMP CORRESPONDING TO HASH VALUE OF ORIGINAL MAIL |

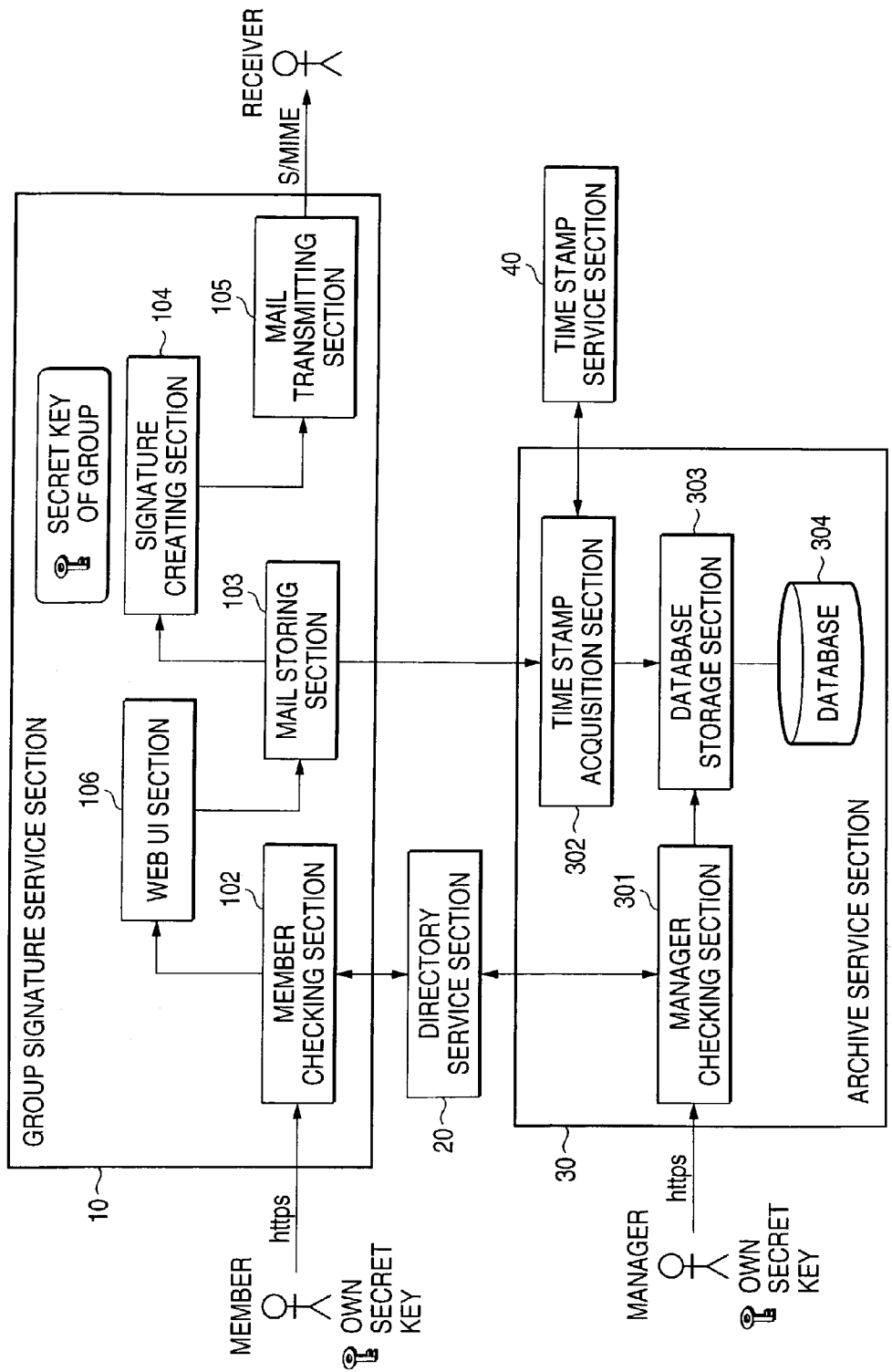

FIG. 8

```
[s01]   <Signature Id="MyFirstSignature" xmlns="http://www.w3.org/2000/09/xmldsig#">
[s02]     <SignedInfo>
[s03]       <CanonicalizationMethod
              Algorithm="http://www.w3.org/TR/2001/REC-xml-c14n-20010315"/>
[s04]       <SignatureMethod Algorithm="http://www.w3.org/2000/09/xmldsig#dsa-sha1"/>
[s05]       <Reference URI="http://www.w3.org/TR/2000/REC-xhtml1-20000126/">
[s06]         <Transforms>
[s07]           <Transform Algorithm="http://www.w3.org/TR/2001/REC-xml-c14n-20010315"/>
[s08]         </Transforms>
[s09]         <DigestMethod Algorithm="http://www.w3.org/2000/09/xmldsig#sha1"/>
[s10]         <DigestValue>j6lwx3rvEPO0vKtMup4NbeVu8nk=</DigestValue>
[s11]       </Reference>
[s12]     </SignedInfo>
[s13]     <SignatureValue>MCOCFFrVLtR1k=...</SignatureValue>
[s14]     <KeyInfo>
[s15a]      <KeyValue>
[s15b]        <DSAKeyValue>
[s15c]          <P>...</P><Q>...</Q><G>...</G><Y>...</Y>
[s15d]        </DSAKeyValue>
[s15e]      </KeyValue>
[s16]     </KeyInfo>
[s17]   </Signature>
```

GROUP SIGNATURE APPARATUS AND METHOD

The present disclosure relates to the subject matter contained in Japanese Patent Application No. 2002-098010 filed on Mar. 29, 2002, which is incorporated herein by reference in its entirety.

BACKGROUND OF THE INVENTION

1. Field of the Invention

This invention relates to an apparatus and method for placing an electronic signature unique to a group on a message transmitted from a member belonging to the group.

2. Description of the Related Art

Hitherto, to transmit an electronic mail (E-mail) for a business purposes, the address of a mailing list (ML) has been entered in a "From:" row for the transmitting E-mail. However, there was a problem that the "From:" row can be easily rewritten and thus the receiving members cannot check for validity. If each member of a job group uses a secret key corresponding to a certificate unique to the job group and affixes an electronic signature to the E-mail, the E-mail receiver can use the certificate to check for validity. However, because that all members belonging to the job group need to hold the secret key, the management of those secret keys tends to be cumbersome and the security becomes less sufficient with changes of the members according to the rotation of the employee.

SUMMARY OF THE INVENTION

Therefore, the invention is implemented in view of the problems, and an object of the invention is to provide a group signature apparatus and method of enabling a member who belongs to a job group to transmit a message with a signature of the job group without holding a secret key of the job group, whereby the receiver can validate that the message is from the job group.

According to the invention, there is provided a group signature apparatus comprising a message receiving section for receiving a message involving authentication; an authenticating section for authenticating each group member for identity; an electronic signature section for affixing an electronic signature of the group to the message if an authentication by said authenticating section results in success; and a message transmitting section for transmitting the message to which the electronic signature of the group is affixed to a predetermined address.

In the configuration, if the main unit of the group signature apparatus authenticates personal identification of the group member, the electronic signature of the group is affixed to the message and the message is distributed. Therefore, the receiver of the message can recognize that the message is from the group without the need for the group member to hold the secret key of the group.

The main unit of the group signature apparatus can authenticate personal identification of the group member based on Secure Socket Layer (SSL) using the electronic signature of the group member on an E-mail and certificate.

A message may be transmitted to an address by E-mail or according to Hyper Text Transfer Protocol (HTTP) and the like. Various types of messages can be used; for example, an extensible markup language (XML) document may be used and as the signature, an XML signature may be used.

The invention may be implemented as a group signature apparatus or system or may be implemented as a mailing list server.

The invention can be embodied not only as an apparatus or a system, but also as a method. Of course, a part of the invention can be implemented as software. A software product used for causing a computer to execute such software is also included in the technical scope of the invention, as a matter of course.

BRIEF DESCRIPTION OF THE DRAWINGS

FIG. 1 is a drawing to show the whole of a group signature apparatus of an embodiment of the invention;

FIG. 2 is a drawing to describe an example of information of group entries of a directory service section in the embodiment of the invention;

FIG. 3 is a drawing to describe an example of information of mail entries retained in an archive service section in the embodiment of the invention;

FIG. 5 is a drawing to show the whole of a group signature apparatus of another embodiment of the invention;

FIG. 8 is a drawing to describe an XML signature that can be used in the embodiment of the invention.

DETAILED DESCRIPTION OF THE PREFERRED EMBODIMENTS

Figures 4A, 4B, 4C:
FIGS. 4A to 4C are drawings to show display examples of manager screens in the embodiment of the invention.

Referring now to the accompanying drawings, a group signature apparatus of the preferred embodiment of the invention has the following features:

There is provided a group signature mail service using a group certificate. A group member would be able to transmit signature mail with the group certificate. In a job group of which a plurality of members is in charge, an E-mail certified by the job group can be transmitted. In the embodiment, use of the apparatus for a response as a support desk, forming an estimate, and the like, is considered. FIG. 1 shows the whole of the group signature apparatus of the embodiment. In the figure, the group signature apparatus comprises a group signature service section 10, a directory service section 20, an archive service section 30, a time stamp service section 40. The group signature apparatus specifically is implemented as one or more server computers and is connected to a network (a LAN, the Internet) not shown for providing service for the manager, the members, or the host of each mail receiver.

The group signature service section 10 includes a mail receiving section 101, a member checking section 102, a mail storing section 103, a signature creating section 104, and a mail transmitting section 105. The mail receiving section 101 receives S/MIME (Secure/Multipurpose Internet Mail Extensions) signature mail from the host of a member. Plain mail may be received; but to place a group signature, signature mail is required as described later. The member checking section 102 checks the electronic signature of signature mail for validity and determines whether or not the member belongs to the group. To check to see if the member belongs to the group, the member checking section 102 accesses the directory service section 20. The directory service section 20 holds group entries for each group (for example, job group). The group entries have information as shown in FIG. 2.

If the member checking section 102 checks that the mail is from a valid member, the mail storing section 103 requests the archive service section 30 to archive the mail. The signature creating section 104 uses a secret key unique to the group (corresponding to a public key of a group certificate) to create an electronic signature of the group. The mail transmitting section 105 transmits the mail with the electronic signature of the group to the receiver. The receiver uses the receiver host to take out the mail from a mail account spool (not shown).

The archive service section 30 includes a manager checking section 301, a time stamp acquisition section 302, a database storage section 303, a database 304. Upon reception of a mail retention request from the mail storing section 103 of the group signature service section 10, the time stamp acquisition section 302 acquires time stamp information from the time stamp service section 40 and the database storage section 303 stores the signature mail and the time stamp in the database 304. Information of mail entries stored in the database 304 is, for example, as shown in FIG. 3. The manager checking section 301 accepts HTTPS (Hyper Text Transfer Protocol over SSL) access from the manager, authenticates the manager for identity, and enables the manager to view the information corresponding to the electronic signatures and the time stamps in the database 304.

The time stamp service section 40 creates a time stamp. The time stamp comprises a signature with a secret key of the time stamp service section 40 on a hash value and time information of signature mail, as described later. The specifications of the time stamp are defined, for example, in RFC (Request For Comment) 3161.

Next, a transmission procedure of group signature mail in the embodiment will be discussed. The procedure is executed as follows:

[Step 1] A member transmits signature mail to the group signature service. At this time, the essential address is described according to "address specification rules". A possible address specification rules are as follows:

1. Describing the address on the first row of the main body of the E-mail.
2. Entering the address in a "To:" field in the format of "'real address', <group signature service address>". In this case, only one address can be specified.
3. Describing the address in a mail header with a unique header specially defined. For example, "X-Recipients:" is defined ("X-" is optional definition of a header components in E-mail format.) and is followed by the essential address.

[Step 2] The group signature service section 10 checks the signature of the signature mail for validity. If the signature is invalid or the transmitter and the signer differ, error mail is returned.

[Step 3] The group signature service section 10 uses the directory service section 20 to check if the signature corresponds to a member in the group. If the signature does not correspond to a member in the group, an error mail is returned to the sender address.

[Step 4] The group signature service section 10 takes out the essential address based on the "address specification rules". If the acquisition of the essential address results in a failure, an error mail is returned to the sender address.

[Step 5] The group signature service section 10 passes the signature mail to the archive service section 30.

[Step 6] The archive service section 30 calculates a hash value of the signature mail and passes the hash value to the time stamp service section 40.

[Step 7] The time stamp service section 40 creates a time stamp from the passed hash value and returns the time stamp to the archive service section 30. The time stamp comprises a signature with a secret key of the time stamp service on the hash value and time information of signature mail, as mentioned above.

[Step 8] The archive service section 30 stores the signature mail and the time stamp in the database 304.

[Step 9] The group signature service section 10 takes out mail text from the signature mail and uses the text to create group signature mail with the secrete key of the group.

[Step 10] The group signature mail is sent to the essential address taken out in [Step 4]. The mail header from the member to the group signature apparatus (mailing list service) is cleared.

[Step 11] The group signature mail receiver checks the signature of the group signature mail for validity based on the group certificate. The mail receiver does not know who the real transmitter is.

Next, a group signature mail checking procedure in the embodiment will be discussed. It enables the manager to manage group signature mail transmitted by the members. The procedure is executed as follows:

[Step 1] The manager accesses the archive service section 30 with a browser. A group signature mail search screen is displayed (FIG. 4A). Whether the manager is valid or not is checked based on SSL client authentication or a password.

[Step 2] The manager enters search conditions on the search screen (FIG. 4A) and makes a search. The search items are, for example, the subject of each E-mail, the body of each E-mail, the date and time each E-mail has stored, or the address of the signature mail transmitter.

[Step 3] The archive service section 30 displays the search result (FIG. 4B). The search results are, for example, the subject of each E-mail, the body to each E-mail, the date and time each E-mail has stored, or the address of the signature mail transmitter.

[4] The manager clicks on the signature mail to be checked on the search result screen (FIG. 4B).

[5] The archive service section 30 displays the contents of the signature mail. At this time, the time stamp stored in the database 304 is checked.

In the embodiment, each member belonging to the job group would be able to transmit mail with the job group signature without the need that the each member to hold the secret key of the group. And the receiver can check that the mail is from the job group. Also, the group manager can use the archive service section 30 to check which member transmitted the E-mail.

Next, another embodiment of the invention will be discussed. In the embodiment, a member transmits group signature mail on a web basis. FIG. 5 shows the whole of the embodiment. Parts identical with or similar to those previously described with reference to FIG. 1 are denoted by the same reference numerals in FIG. 5.

Figure 6:
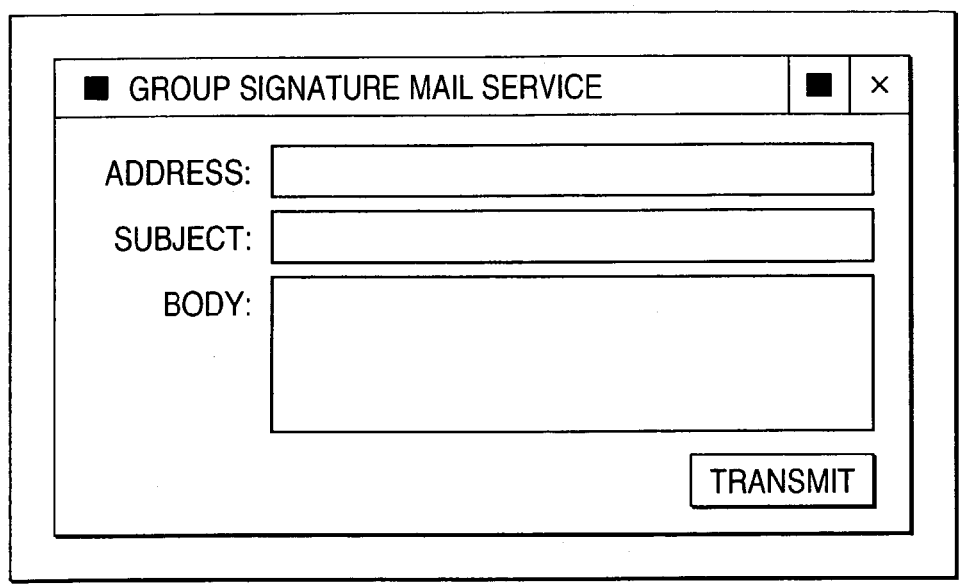
FIG. 6 is a drawing to show a display example of a web screen when a request to transmit group signature mail is made in the embodiment of the invention.

In FIG. 5, a web user interface section 106 and a member checking section 102 are implemented as a web server, an application server (which may be a GGI program or the like), etc. The member checking section 102 authenticates each member for identity based on SSL, or a password. The web user interface section 106 transmits a web page producing display as shown in FIG. 6 to the host of a member and accepts input of address, subject, and text using the input form from the member. The address, subject, and text input using the input form are used to prepare a mail message. Other components and operation are similar to those previously described with reference to FIG. 1 and therefore will not be discussed again. In the embodiment, mail stored in an archive service section 30 does not contain a member signature (because signature mail is not received).

Figure 7:
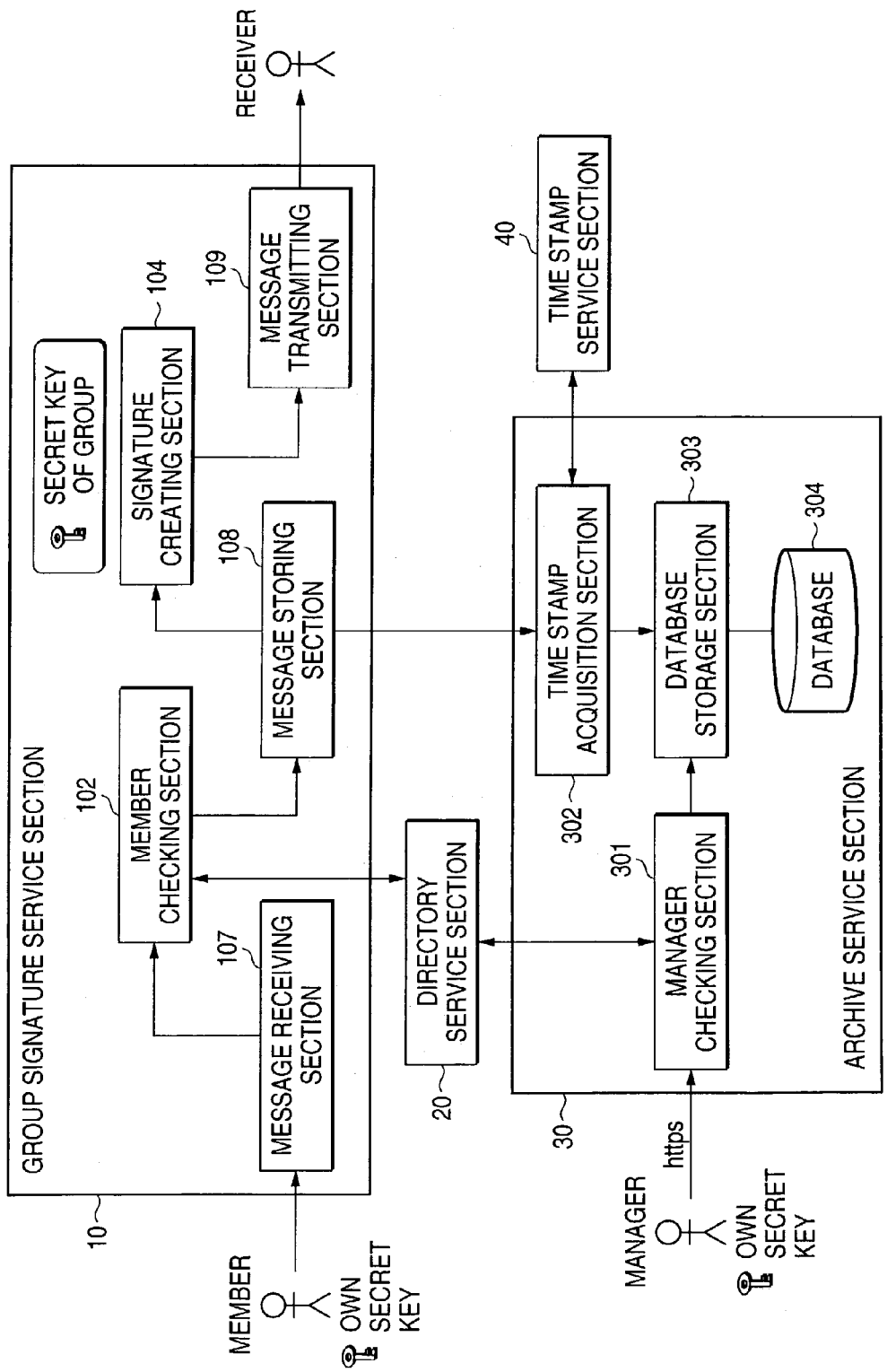
FIG. 7 is a drawing to show the whole of a group signature apparatus of still another embodiment of the invention.

Next, still another embodiment of the invention will be discussed. In the embodiment, an XML document with an XML signature is transmitted as a message according to any desired protocol such as HTTP. FIG. 6 shows the whole of the embodiment. Parts identical with or similar to those previously described with reference to FIG. 1 or FIG. 5 are denoted by the same reference numerals in FIG. 7. In FIG. 7, a message reception section 107 receives a message from a member and the message is transmitted from a message transmission section 109. The message is transmitted and received by a "PUT method" of HTTP, for example. Of course, the method is not limited to the PUT method. The received message is stored in an archive service section 30 by a message retention section 108.

A predetermined signature is affixed to the message transmitted to the receiver. For example, for an XML document message, an XML signature is used. The XML signature is, for example, as shown in FIG. 8; 'Signed info' tag represents the object to be signed and 'SignatureValue' tag represents signature data.

In the example in FIG. 8, the member can be authenticated for identity based on SSL or using an electronic signature. From the member to the receiver, all messages may be XML documents and first the member may be checked based on the XML signature of the member and then the XML signature of the group may be used to transmit the message to the receiver.

Figure 9:
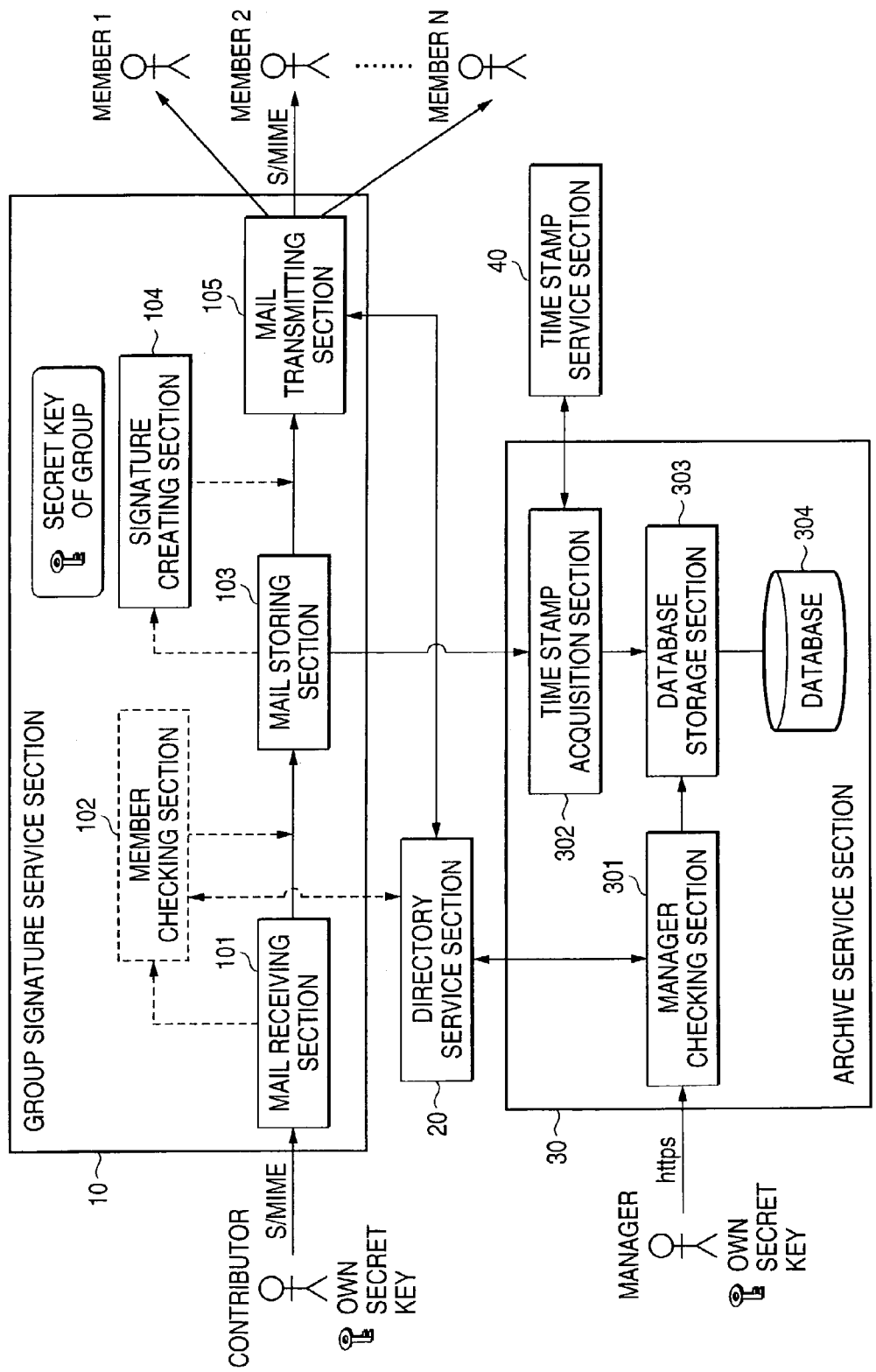
FIG. 9 is a drawing to describe an example of applying the invention to a mailing list server.

It is understood that the invention is not limited to the specific embodiments thereof and widely different embodiments of the invention may be made without departing from the spirit and scope thereof. For example, the invention has been described as the group signature apparatus, but the apparatus can also be configured intact as a mailing list server. For example, as shown in FIG. 9, mail transmitted from a contributor (for example, a receiver attempted to reply to group signature mail) to the contribution mail address of mailing list (mail address on "From:" row of the group signature mail) is received by a mail receiving section 101, the mail addresses of members are acquired from a directory service section 20, and the mail is transmitted to the members by a mail transmitting section 102. Parts identical with or similar to those previously described with reference to FIG. 1, etc., are denoted by the same reference numerals in FIG. 9 and will not be discussed again in detail.

In the described example, on the "From:" row, the mail address of the member of the transmitter is replaced with the mail address of the group (mail address of mailing list). However, the mail address of the member can also be left intact by describing the mail address of the group on a "Reply-to:" row in some cases.

As described above, according to the invention, if the member is a member who belongs to a job group, the member can transmit mail with a signature of the job group without holding the secret key of the group. Therefore, the receiver can check that the mail is from the job group.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A group signature apparatus comprising:
   a message receiving section for receiving a message involving authentication from a member belonging to a group, wherein said authentication is an electronic signature;
   an authenticating section for authenticating each group member for identity within the group to authenticate the message by validating the electronic signature of the message of an electronic mail received by said message receiving section;
   an electronic signature section for affixing a unique electronic signature of the group, using a secret key of the group unknown to members of the group, to an authenticated message; and
   a message transmitting section for transmitting the authenticated message to which the unique electronic signature of the group is affixed to a predetermined address.

2. The group signature apparatus as claimed in claim 1, wherein said message receiving section receives the message by electronic mail.

3. The group signature apparatus as claimed in claim 1, wherein said message receiving section receives the message according to Hyper Text Transfer Protocol.

4. The group signature apparatus as claimed in claim 3, wherein said authenticating section authenticates each group member for identity based on a Secure Socket Layer.

5. The group signature apparatus as claimed in claim 1, wherein said message transmitting section transmits the message to which the electronic signature of the group is affixed to a predetermined address by electronic mail.

6. The group signature apparatus as claimed in claim 1, wherein said message transmitting section transmits the message to which the electronic signature of the group is affixed to a predetermined address according to Hyper Text Transfer Protocol.

7. The group signature apparatus as claimed in claim 6, wherein the message comprises the electronic signature affixed to an extensible markup language document.

8. A group signature method comprising the steps of:
   receiving a message involving authentication from a member of a group, wherein said authentication is an electronic signature;
   authenticating each group member for identity within the group to authenticate the message by validating the electronic signature of the message of an electronic mail received by said message receiving section;
   affixing a unique electronic signature of the group, using a secret key of the group unknown to members of the group, to an authenticated message; and
   transmitting the authenticated message to which the unique electronic signature of the group is affixed to a predetermined address.

9. A group signature compute program stored in a computer medium that causes a computer to execute a steps of:
   receiving a message involving authentication from a member belonging to a group, wherein said authentication is an electronic signature;
   authenticating each group member for identity within the group to authenticate the message by validating the electronic signature of the message of an electronic mail received by said message receiving section;

affixing a unique electronic signature of the group, using a secret key of the group unknown to members of the group, to the authenticated message; and transmitting the authenticated message to which the unique electronic signature of the group is affixed to a predetermined address.

10. A group signature apparatus comprising:

a message receiving section for receiving a message from a member of a group containing an electronic mail address to be transmitted, and involving authentication, wherein said authentication is an electronic signature;

an authenticating section for authenticating each group member for identity within the group to authenticate the message by validating the electronic signature of the message of an electronic mail received by said message receiving section;

an electronic signature section for affixing a unique electronic signature of the group, using a secret key of the group unknown to members of the group, to an authenticated message; and a message transmitting section for transmitting the authenticated message to which the unique electronic signature of the group is affixed to the electronic mail address contained in the message with an electronic mail address representing the group as a transmission source.

11. The group signature apparatus as claimed in claim 10 further comprising:

a mail address storing section for storing electronic mail address information of the group member;

second message receiving section for receiving a message transmitted to the electronic mail address representing the group; and a distributing section for distributing the message received by said second message receiving section to the electronic mail address of the group member by using the electronic mail address information stored in said mail address storing section.

12. A mailing list server comprising:

a mail address storing section for storing electronic mail address information of a member and a group to which the member belongs;

a message receiving section for receiving a message involving authentication of a user who sends the message, wherein said authentication is an electronic signature;

an authentication section for authenticating each group member for identity to authenticate the message by validating the electronic signature of the message of an electronic mail received by said message receiving section;

an electronic signature section for affixing a unique electronic signature of the group, using a secret key of the group unknown by members of the group, to an authenticated message; and a message transmitting section for transmitting the received message to which the unique electronic signature of the group is affixed with an electronic mail address representing the group as a transmission source.

13. The mailing list server as claimed in claim 12 further comprising:

a mail archiving section for archiving the message from the member whose authentication by said authentication section results in success.

* * * * *